United States Patent [19]

Hattori et al.

[11] Patent Number: 5,638,441
[45] Date of Patent: Jun. 10, 1997

[54] PORTABLE TELEPHONE APPARATUS WITH ROTATABLE COVER ALLOWING ENHANCED OPTION KEY ACCESS

[75] Inventors: Yoshihiro Hattori; Naoki Ikeda; Yoshifumi Sagane; Satoshi Shinya, all of Amagasaki, Japan

[73] Assignee: Mitsubishi Denki Kabushiki Kaisha, Tokyo, Japan

[21] Appl. No.: 465,183

[22] Filed: Jun. 5, 1995

Related U.S. Application Data

[63] Continuation of Ser. No. 177,940, Jan. 6, 1994, abandoned.

[30] Foreign Application Priority Data

Feb. 26, 1993 [JP] Japan ................................ 5-037872

[51] Int. Cl.⁶ .................................................... H04M 1/00
[52] U.S. Cl. ............................................ 379/433; 379/434
[58] Field of Search ............................... 379/433, 434, 379/451, 437, 428; 455/89, 90

[56] References Cited

U.S. PATENT DOCUMENTS

| D. 306,298 | 2/1990 | Sawada et al. | 379/433 |
| 5,214,794 | 5/1993 | Van Wijnen | 455/90 |
| 5,257,310 | 10/1993 | Takagi et al. | 379/433 |
| 5,384,844 | 1/1995 | Rydbeck | 379/433 |

FOREIGN PATENT DOCUMENTS

| 135959 | 8/1984 | Japan | 379/433 |
| 4-23547 | 1/1992 | Japan | 379/437 |
| 2235606 | 3/1991 | United Kingdom . | |
| 9113507 | 9/1991 | WIPO . | |
| 9413088 | 6/1994 | WIPO . | |

*Primary Examiner*—Thomas W. Brown
*Assistant Examiner*—Jack Chiang
*Attorney, Agent, or Firm*—Rothwell, Figg, Ernst & Kurz

[57] ABSTRACT

In the main body of a portable telephone apparatus, there are provided an operation section, which contains at least one option key having a communication function other than a dial key or dial function, a speaker for outputting a voice from a remote calling party, and a microphone for receiving and sending a user's voice to the remote party. A cover which allows the option key to be exposed while concealing the rest of the operation section is rotatably attached to the main body. With this construction, it is made possible for the user to operate the option key either directly or indirectly while the cover is closed. Further, it is possible to reduce the complexity of the operation when calls are received.

3 Claims, 7 Drawing Sheets

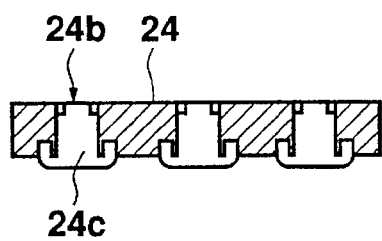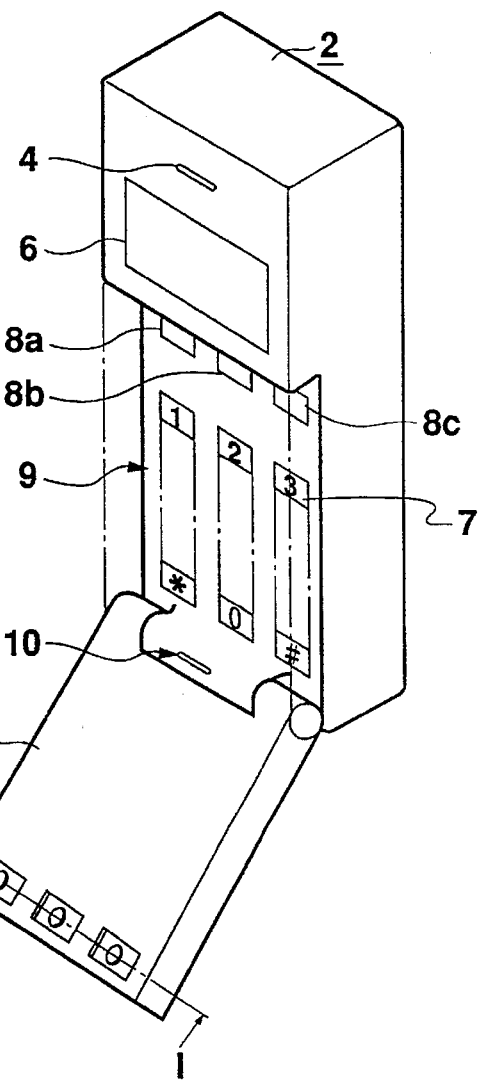

PORTABLE TELEPHONE APPARATUS WITH ROTATABLE COVER ALLOWING ENHANCED OPTION KEY ACCESS

This is a continuation of application Ser. No. 08/177,940, filed Jan. 6, 1994, now abandoned.

BACKGROUND OF THE INVENTION

1. Field of the Invention

This invention relates to a portable or cordless telephone apparatus, and more particularly to an improvement in the cover structure thereof.

2. Description of the Related Art

As well as two way communication between fixed points, mobile communications, which includes two way communication between a freely movable mobile station and a fixed point, and between two mobile stations, is currently undergoing expansion. Portable telephones or cordless type telephones (referred to below simply as portable telephones) are used as devices for carrying out this mobile communication.

These will be explained with reference to FIGS. 1(a) and 1(b) of the accompanying drawings. (International Laid-open WO 91/13507, U.S. Pat. No. 4,897,873) FIG. 1(a) is a front view of a prior art portable telephone apparatus, and FIG. 1(b) is a side view of the same portable telephone apparatus. Here, in the telephone apparatus main body 2, a speaker 4 is provided in the upper end portion to output the voice of a remote party, and in a lower portion, a microphone 10 is provided for receiving the user's voice and sending it as a signal to the remote party. In the middle portion of the telephone apparatus main body 2, an indication portion 6, consisting of a liquid crystal type display, and an operating portion 9 are provided. This operating portion 9 consists of dial keys 7, having a dialing function, and option keys 8 having communicating functions other than the dialing function.

An antenna 12, for communication by sending and receiving radio waves, is shown in the middle of the diagram. 14 is a cover which is held in a rotatable manner at one end of the upper portion of the telephone apparatus main body, and when communication is not required, to prevent erroneous or accidental operation, by closing the side of the telephone apparatus, the operating portion is concealed. As can be seen from the drawing, when this cover 14 is open, it functions as a kind of sound accumulating board for the microphone.

In the above mentioned portable telephone apparatus, in order to prevent accidental or erroneous operation when not making a call on the telephone, the user closes the cover 14, puts it in his jacket pocket or bag and carries it with him. Then, external phone calls are received, and when such calls are received by the portable telephone apparatus, the portable telephone apparatus makes the receipt known to the user by issuing a calling alarm. The user then removes the telephone from wherever it was placed, a jacket pocket or bag, and by opening the cover 14, presses one of the option keys, either the receive or respond key. If the respond key is pressed, the portable telephone enters the communicating state, and the user can speak with the remote party who placed the call.

With the prior art portable telephone constructed as shown above, the following problems were encountered.

That is, as previously explained, with the above mentioned portable telephone apparatus, when not being used for a call, because the cover 14 is closed and the apparatus is stored away, when a call is received, the user takes the telephone from his bag or pocket, and unless the cover 14 is opened again, a desired respond or receive operation cannot be carried out, which means that this operation caused problems in an emergency.

Also, unless the respond or hold key is pressed, the calling alarm sound will generally continue ringing. As a result, for example, if the user is the middle of a meeting or such when a call is received, because of concern toward other people present he rushes the respond operation, and as a result there was a possibility of erroneous operation or damage to the portable telephone occurring. Further, in the case where the user receives a call while he is driving a vehicle, because the respond operation is troublesome, there was also the possibility that the user's safety is impaired.

SUMMARY OF THE INVENTION

It is therefore an object of the present invention to provide a portable telephone apparatus which is simple in construction and which possesses a respond operation especially with respect to when calls are received.

According to the present invention, there is provided a portable telephone apparatus having a telephone apparatus main body, comprising: an operating means including at least one option key having a communication function other than a dial key or dial function; a speaker for outputting a voice from a remote party; and a microphone for sending a voice to said remote party; wherein a cover is rotatably attached to the telephone apparatus body main body, said cover, when closed, concealing said operating means while allowing at least one of said option keys to be exposed.

That is, the present invention consists of a telephone handset apparatus which provides operating means consisting of at least one option key having a communication function other than a dial function or dial key, a speaker for outputting a voice from a remote caller, a microphone for transmitting a voice to the remote user, and a cover, rotatably attached to the telephone handset apparatus main body, which when closed, while concealing the operating means, allows at least one of the option keys to be exposed.

The option key has the distinctive features possessed by at least one of the respond key, the recall key, or the hold key.

Further, the cover has the feature of a hole (opening) corresponding to at least the position of the option key for when it is closed.

Still further, the microphone is not concealed by the cover when it is in the closed state, but has the feature of being exposed. This microphone has the feature of being provided in the vicinity of the section where the cover of the telephone handset apparatus is rotatably attached.

With the cover of the portable telephone apparatus of the present invention, a hole cover is provided that allows opening and closing of the aforementioned opening when the operating section is in the concealed state due to closing of the cover. This hole cover is preferably a sliding style cover.

The separate construction of the cover has the distinctive features that when it is closed, it has a hole (opening) corresponding to at least the option key, and that within this opening, a push button is provided for indirectly pressing the option key.

If a portable telephone apparatus is provided based on the present invention, it is made possible for the option key having the non dialing communication function to be directly or indirectly operated by the user with the cover remaining closed. Also, if the microphone is exposed when the cover is closed, then it also becomes possible to communicate with the cover remaining closed. Consequently, complications with operation when special calls arrive at the portable telephone are reduced, and it is possible to greatly increase the operability.

Again, the hole corresponding to the option key is provided in the cover, and if the option key is caused to be exposed when the cover is closed, then when calls are received or the apparatus is concealed, it is made possible to prevent erroneous operation etc. of the portable telephone apparatus. Further, if the hole cover is provided on an outer side of the cover, then when operation is not required, erroneous operation etc. can be reliably prevented.

Further, if the push button is provided within the hole, then the operability when calls are received can be increased still further.

BRIEF DESCRIPTION OF THE DRAWINGS

FIG. 5(a) is a perspective view of a portable telephone apparatus according to the third embodiment of the present invention;

FIG. 5(b) is a cross-sectional view taken along line I—I in FIG. 5(a);

DETAILED DESCRIPTION

The preferred embodiments of the present invention will now be explained using the accompanying drawings.

Embodiment 1

Figure 1A:
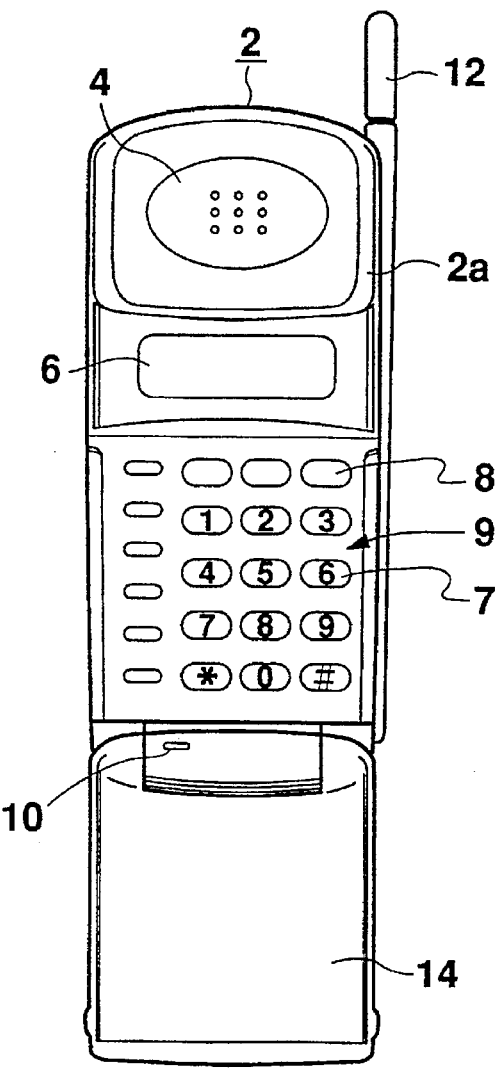
FIG. 1(a) is a front view of a prior art portable telephone apparatus.
Figure 1B:
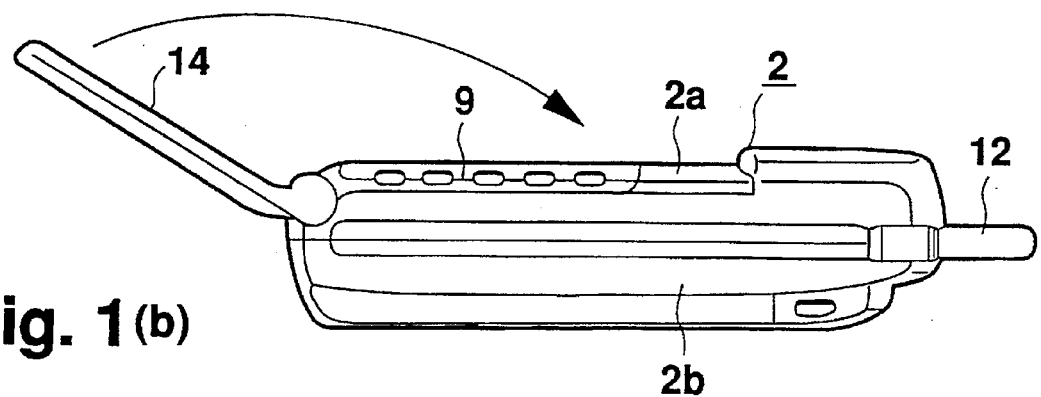
FIG. 1(b) is a side view of a prior art portable telephone apparatus.
Figure 2:
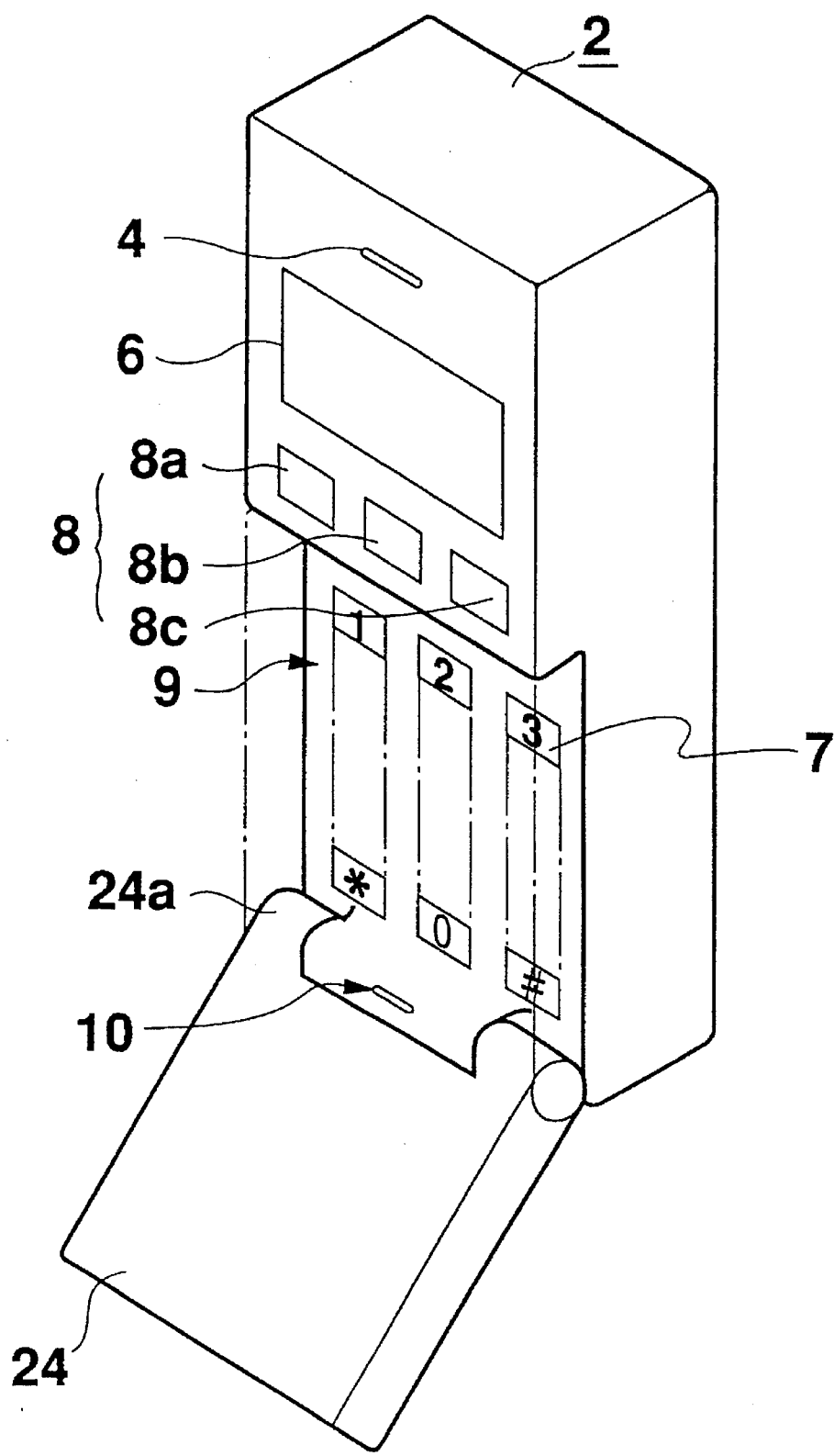
FIG. 2 is a perspective view of a portable telephone apparatus according to the first embodiment of the present invention.

FIG. 2 is a perspective view of a portable telephone apparatus according to an embodiment of the present invention. The same numerals are applied to the similar portions explained previously, and explanation of these parts will be omitted.

A speaker 4 is provided at an upper portion of the telephone apparatus 2, to output a remote party's voice, and a microphone 10 for detecting a voice and transmitting it to the remote party is provided at a lower portion. In the middle portion of the telephone apparatus 2, there is provided an indication unit 6, consisting of a liquid crystal type display, and an operation section 9. This operation section 9 comprises dial keys 7 having a dialing function, and option keys 8, having a non dialing communication function. The option keys 8 are made up of a key 8a for responding when calls are received, a recall key 8b for recalling to a phone number that was called the time before and has been stored in advance in memory, and also a key 8c with a hold state for when calls are received, or a reserved response to cause communication to be terminated (end key). The type of function key is not limited to those mentioned, and depending on the portable phone apparatus, there are also cases with keys having still other functions. On the other hand, as well as having the aforementioned respond key 8a, recall key 8b and hold key 8c, there is the case where only one or two keys are provided.

In the center of the drawing, numeral 24 is a cover rotatably attached at one end to the lower portion of the telephone apparatus 2. When communication is not required, it is possible to close the cover 24 to the side of the telephone apparatus, and by closing the cover, at least the dial keys 7 of the operation section 9 are concealed. Also, the area where the respond key 8a, recall key 8b and hold key 8c of the option keys 8 are arranged is not concealed by the cover 24 even when it is closed, and remains exposed, with the result that these keys become operable when the cover 24 is in the closed state. If the cover 24 is opened, the rest of the dial keys 7 are exposed, and it is possible to carry out general communication. When this cover 24 is open, as shown in the drawing, it functions as a board to direct sound toward the microphone 10.

With the above portable telephone apparatus, to prevent erroneous or accidental operation when not communicating, the user closes the cover 24, puts the apparatus in a jacket pocket or bag and thus caries it with him. Then, a call is made to the portable telephone from outside which the portable telephone sees as a received call. The portable telephone then generates a call alarm, and the fact that a call has been received is made known to the user. The user then takes the telephone apparatus from wherever it is placed, for instance the pocket or bag, and without opening the cover 24, by directly pressing the respond key 8a communicates with the person who made the call.

Figure 3:
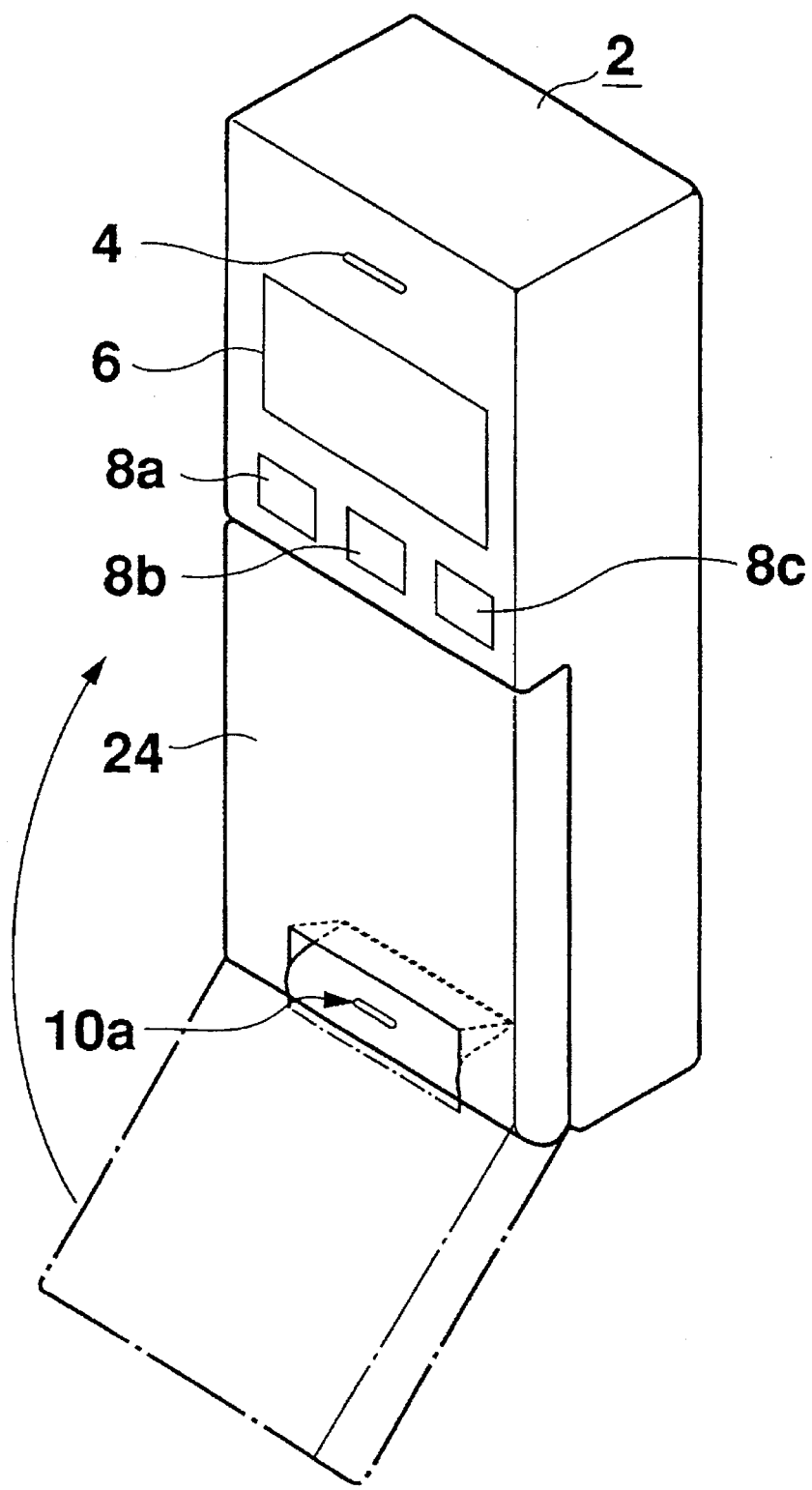
FIG. 3 is a perspective view showing the cover of the portable telephone apparatus of FIG. 2 in the closed state.

As shown in FIG. 3, with the cover 24 in the closed state, the cover 24 does not conceal the microphone 10, but allows it to remain externally exposed. If the sound hole 10a opening to the microphone 10, is constructed opening in a similar direction to the speaker 4, there is no relationship to the opening or closing of the cover 24, that is it becomes possible to communicate with the remote party even when the cover 24 is closed, which enables a further improvement in the operability of the portable telephone when calls are received.

As a result, even when the user is rushing, when a call is received for example, the respond action only requires the removal of the telephone apparatus from wherever it is concealed and the pressing of the respond key 8a, which can be done in a short time and with one hand, so it is possible to reduce erroneous operation or damage. Further, it is extremely effective when receiving calls in narrow or crowded places.

Also, in the situation where the user is in a meeting when a call is received, and so cannot communicate immediately, he removes the telephone apparatus from its concealment and without opening the cover 24 directly presses the hold key 8c. By doing this, the call alarm is switched off. Then, the user leaves the meeting room and enters a corridor, for instance, and is then in a communicable state, and so by pressing the respond key 8a the user is able to communicate with the remote party. Also, in the case of the user receiving a call while he is driving a vehicle, by enabling a quick and simple respond action, problems likely to impair safety are also reduced. Further, also in the situation where the user of this portable telephone apparatus makes a call and the called party is in the middle of a conversation, without opening the cover 24, it is possible to press the recall key 8b, and so operation is simple.

If the cover 24 is in the closed state, it is not always necessary for the whole of the option keys to be exposed. For example, it is allowable for the body of only the respond key 8a to be exposed, while the other recall key 8b and hold key 8c are concealed by the cover 24, similarly to the dial function keys, 7.

Embodiment 2

Figure 4:
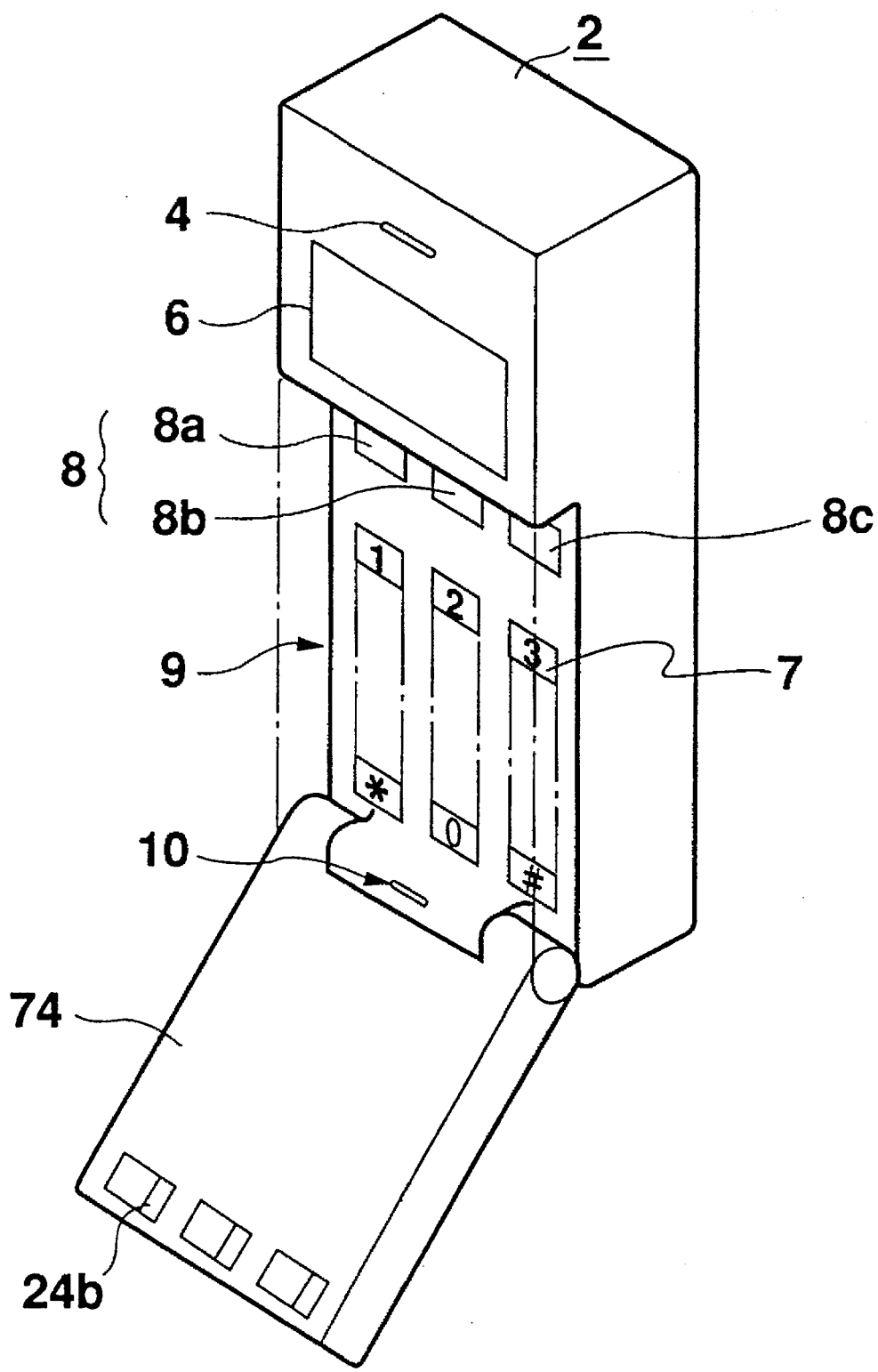
FIG. 4 is a perspective view of a portable telephone apparatus according to the second embodiment of the present invention.

Next, a portable telephone apparatus having a different construction from embodiment one will be explained making use of FIG. 4. In this diagram, parts which are the same as the previous drawings have the same reference numerals attached thereto, and their explanation will be omitted.

As a distinctive feature of this embodiment, option key holes 24b are specifically provided in the cover 24 at points corresponding to the position of the option keys, for the situation where the cover 24 is opened from the side of the telephone apparatus. Because of the provision of these holes 24b, the user can carry out the respond operation by directly pressing the option keys 8, even when the cover 24 is in the closed state. Particularly, the operating portion 9 other than the option keys 8 is concealed by the cover 24, so while the telephone apparatus is stored away, accidental or erroneous operation can be prevented. That is, while the telephone apparatus is stored away, it is possible to cause the outer surface of the option keys to be positioned slightly below the outer surface of the cover 24, and as a result, the possibility of accidentally coming into contact with the option keys can be reduced.

Embodiment 3

Another embodiment of the present invention will now be explained with reference to FIG. 5.

As a distinctive feature of this embodiment, inside the option key holes which are 24b similar to embodiment two, a place is provided for a push button 24c that is used to indirectly press the option keys. This push button 24c is preferably constructed by packing a rubber type resilient member into the hole 24b, after the hole has been formed. It is not always necessary to have a resilient body as this push button 24c, and as long as it is possible to press from the outside when the cover 24 is in the closed state, it may be molded as part of the cover 24. So, due to the provision of the push button 24c inside the option key hole 24b, while the cover 24 is in the closed state, operation of the option keys 8 from the outer surface of the cover 24 becomes easier.

Embodiment 4

Figure 6:
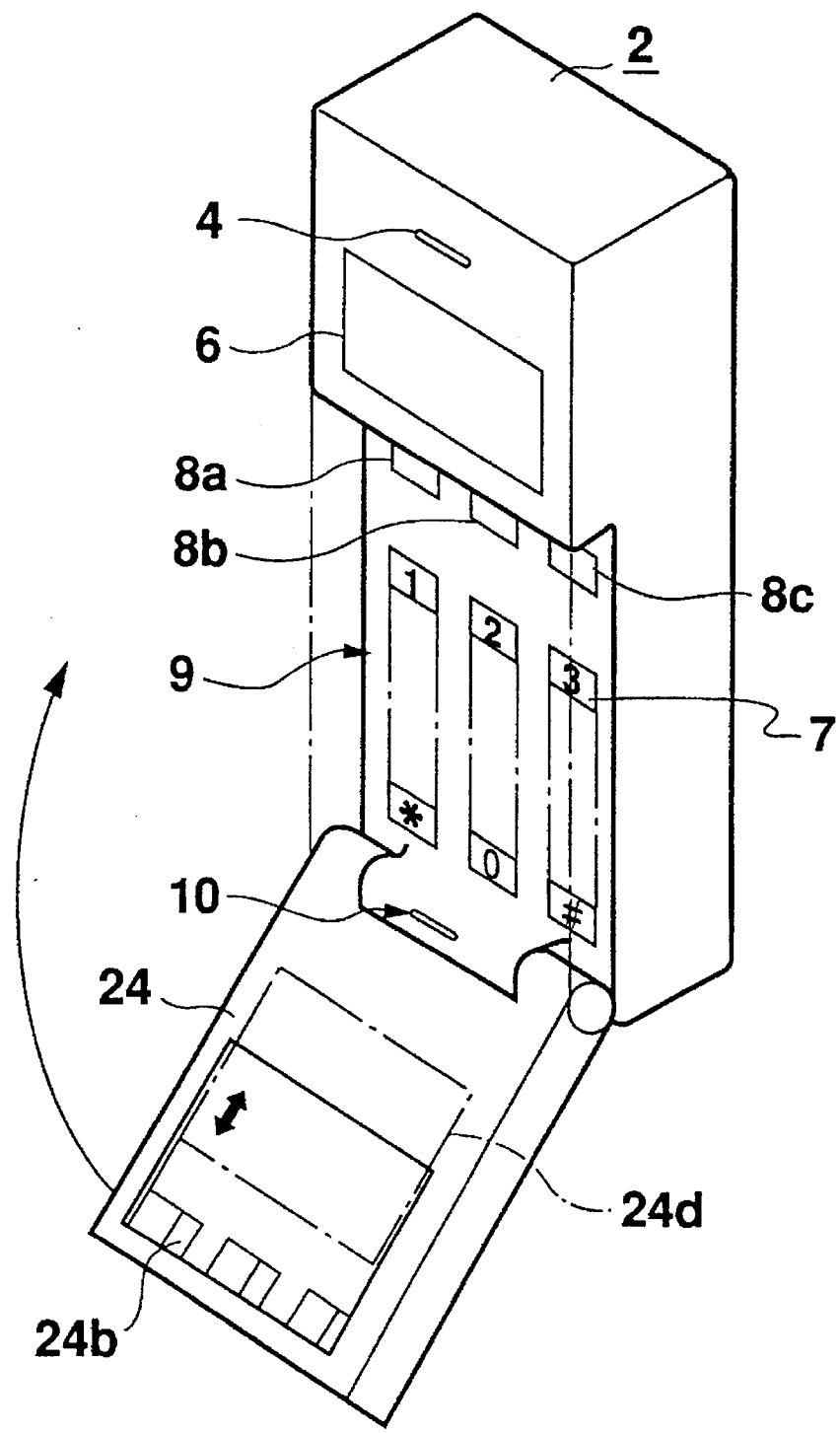
FIG. 6 is a perspective view of a portable telephone apparatus according to the fourth embodiment of the present invention.
Figure 7:
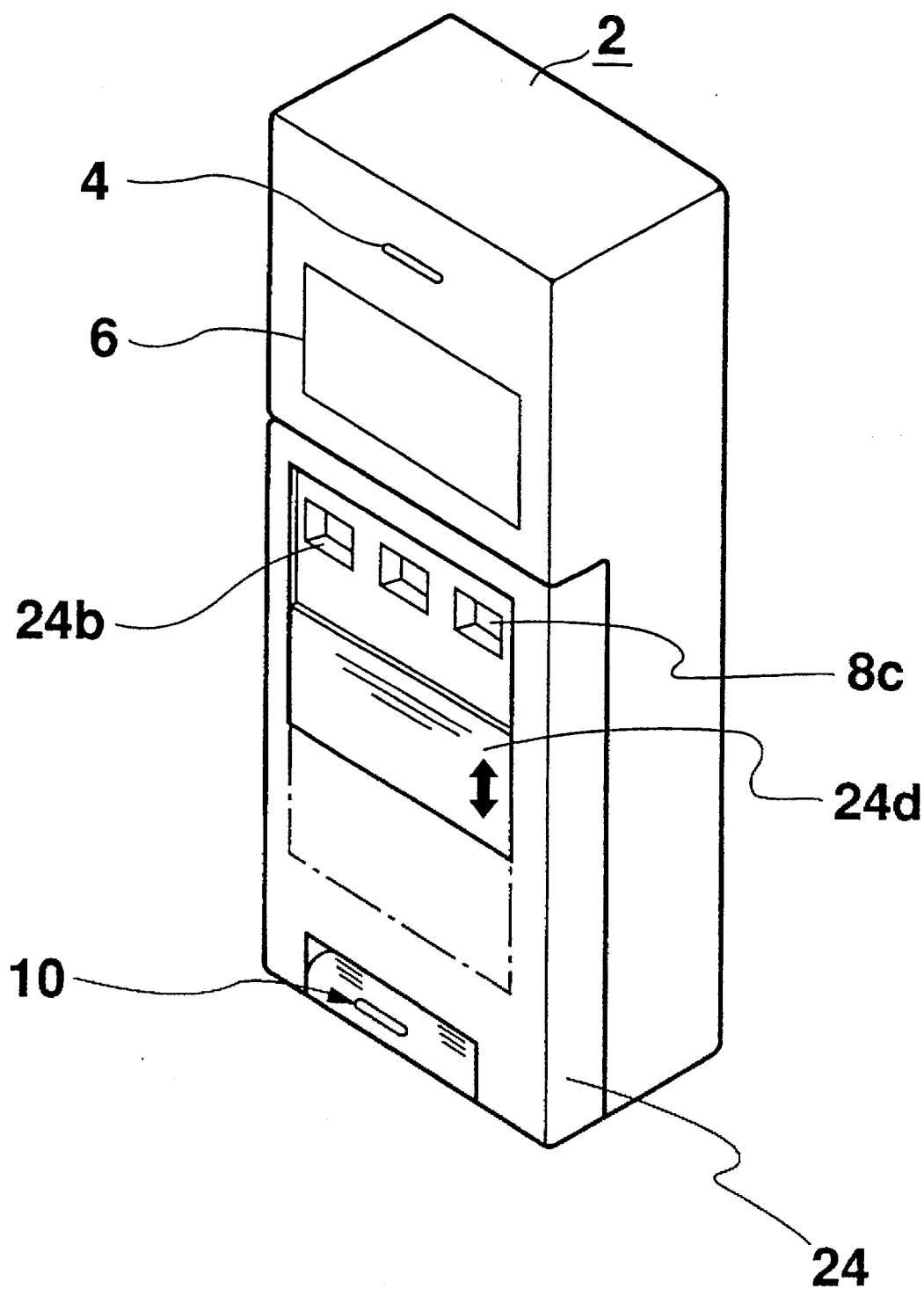
FIG. 7 is a perspective view showing the cover of the portable telephone apparatus of FIG. 6 in the closed state.

Next, an embodiment which is an improvement to embodiment 2 will be explained using FIGS. 6 and 7.

As a feature of this embodiment, in order to block the option key hole 24b which is provided in the cover 24, when operation of the portable telephone apparatus is not required, a hole cover 24d consisting of a sliding plate has been provided. With the cover 24 in the closed state, this hole cover 24d can be freely made to slide (up and down, or from left to right) by the user from the outside. If this hole cover 24d blocks the hole 24b while it is closed, then it is possible to reliably prevent the option keys from being accidentally operated when operation of the portable telephone is not required.

Furthermore, if the hole cover 24d as described with this embodiment is a sliding plate which is slidable up and down, then when a call is received, the overall amount of hand or finger movement needed to open the hole cover 24d is extremely small compared to the amount of movement needed to open the hole cover 24d, which means that the respond operation can be carried out simply and in a short time.

If a push button 24c as shown in embodiment 3 Is provided inside the option key hole 24b, the operability of the respond key when a call is received can be improved still further.

What is claimed is:

1. A portable telephone apparatus having a telephone apparatus main body comprising:

(a) an operating means including at least one option key having a communication function other than a dial key or dial function;

(b) a speaker for outputting a voice from a remote party; and (c) a microphone for sending a voice to said remote party;

wherein a cover is rotatably attached to the telephone apparatus main body, said cover, when closed, concealing said operating means while allowing said at least one option key to be exposed through an opening in said cover, and wherein said cover has a hole cover, said hole cover being able to open and close said opening while said operating means is concealed by the closing of said rotatably attached cover.

2. A portable telephone apparatus according to claim 1, wherein said hole cover is a slidably mounted cover.

3. A portable telephone apparatus having a telephone apparatus main body comprising:

(a) an operating means including at least one option key having a communication function other than a dial key or dial function;

(b) a speaker for outputting a voice from a remote party; and (c) a microphone for sending a voice to said remote party;

(d) wherein a cover is rotatably attached to the telephone apparatus main body, said cover, when closed, concealing said operating means while allowing said at least one option key to be exposed through an opening in said cover, (e) wherein said microphone is not covered by said cover when said cover is in the closed state, but is exposed, and (f) wherein said cover is provided with an opening cover for said opening, said opening cover allowing said opening to be opened and closed while said operating means is in the concealed state due to said rotatably attached cover being closed.

\* \* \* \* \*

UNITED STATES PATENT AND TRADEMARK OFFICE
CERTIFICATE OF CORRECTION

PATENT NO. : 5,638,441
DATED : June 10, 1997
INVENTOR(S) : YOSHIHIRO HATTORI ET AL.

It is certified that error appears in the above-identified patent and that said Letters Patent is hereby corrected as shown below:

COLUMN 2

Line 7, "is" should read --is in--.

COLUMN 4

Line 27, "caries" should read --carries--.

Signed and Sealed this

Second Day of December, 1997

Attest:

BRUCE LEHMAN

Attesting Officer

Commissioner of Patents and Trademarks